United States Patent [19]

Nelsen et al.

[11] Patent Number: 5,607,182

[45] Date of Patent: *Mar. 4, 1997

[54] STRUCTURALLY EFFICIENT INFLATABLE PROTECTIVE DEVICE

[75] Inventors: James M. Nelsen, Tijeras; Larry D. Whinery, Albuquerque; Kenneth W. Gwinn, Cedar Crest; Donald D. McBride, Albuquerque; Daniel A. Luna, Los Lunas, all of N.M.; Joseph P. Holder; Richard J. Bliton, both of Greensboro, N.C.

[73] Assignees: Sandia Corporation, Del.; Precision Fabrics Group, Inc., N.C.

[ * ] Notice: The term of this patent shall not extend beyond the expiration date of Pat. No. 5,482,317.

[21] Appl. No.: 604,422

[22] Filed: Feb. 21, 1996

Related U.S. Application Data

[63] Continuation of Ser. No. 355,241, Dec. 9, 1994, Pat. No. 5,533,755, which is a continuation of Ser. No. 82,471, Jun. 28, 1993, Pat. No. 5,482,317.

[51] Int. Cl.⁶ ................................................ B60R 21/16
[52] U.S. Cl. ................................ 280/743.1; 280/728.1; 428/36.1
[58] Field of Search ........................ 280/743.1, 743.2, 280/728.1, 739, 741; 383/3; 428/35.5, 36.1, 224, 225

[56] References Cited

U.S. PATENT DOCUMENTS

| | | | |
|---|---|---|---|
| Re. 33,938 | 5/1992 | Cuevas | 280/731 |
| 3,807,754 | 4/1974 | Rodenbach et al. | 280/743.1 |
| 3,842,583 | 10/1974 | Gage | 280/743.1 |
| 3,879,057 | 4/1975 | Kawashima et al. | 280/743.2 |
| 3,991,249 | 11/1976 | Yamashita et al. | |
| 4,559,975 | 12/1985 | Stits | |
| 4,872,276 | 10/1989 | Godfrey | |
| 4,921,735 | 5/1990 | Bloch | 428/34.9 |
| 4,944,529 | 7/1990 | Backhaus | 280/743.1 |
| 4,977,016 | 12/1990 | Thornton et al. | 428/225 |
| 4,988,118 | 1/1991 | Good et al. | 280/743.1 |
| 5,010,663 | 4/1991 | Thornton et al. | |
| 5,011,183 | 4/1991 | Thornton et al. | 280/743.1 |
| 5,016,914 | 5/1991 | Faigle et al. | 280/741 |
| 5,033,771 | 7/1991 | Miyauchi et al. | 280/743.1 |
| 5,044,663 | 9/1991 | Seizert | 280/731 |
| 5,073,418 | 12/1991 | Thornton et al. | 428/34.9 |
| 5,094,476 | 3/1992 | Chihaya | 280/743.1 |

(List continued on next page.)

FOREIGN PATENT DOCUMENTS

| | | | |
|---|---|---|---|
| 2034067 | 1/1991 | Canada . | |
| 0485603 | 5/1992 | European Pat. Off. | 280/743.1 |
| 0485601 | 5/1992 | European Pat. Off. | 280/743.1 |
| 2528636 | 1/1976 | Germany | 280/743.1 |
| 2439222 | 2/1976 | Germany | 280/743.1 |
| 52-77338 | 6/1977 | Japan | 280/743.1 |
| 3-10946 | 1/1991 | Japan | 280/743.1 |
| 3-136946 | 6/1991 | Japan | 280/743.2 |
| 5-77342 | 3/1993 | Japan | 280/743.1 |

*Primary Examiner*—Brian L. Johnson
*Assistant Examiner*—Peter C. English
*Attorney, Agent, or Firm*—Finnegan, Henderson, Farabow, Garrett & Dunner

[57] ABSTRACT

An apparatus and method for making a low cost, self-venting, inflatable protective cushion of simple and structurally efficient design with a shape and construction that optimizes the cushion's ability to withstand inflation pressures and impact when deployed which includes a sheet defined by at least one fold line and a plurality of flap portions, each flap portion having a base edge corresponding to a fold line and at least two side edges each extending outwardly from a base edge and ultimately converging to meet each other, the flap portions being folded at the fold line(s) and being joined at corresponding side edges to define an inflatable chamber. The inflatable protective cushion and method for making same may further include a lightweight, low permeability, fabric that optimizes the cushion's ability to withstand inflation pressures and impact when deployed and minimizes the packed volume of the cushion when stored.

6 Claims, 9 Drawing Sheets

U.S. PATENT DOCUMENTS

| | | | |
|---|---|---|---|
| 5,094,477 | 3/1992 | Togawa | 280/743.1 |
| 5,098,125 | 3/1992 | Thornton et al. | 280/743.1 |
| 5,100,169 | 3/1992 | Goor et al. | 280/733 |
| 5,208,097 | 5/1993 | Honma et al. | 428/36.1 |
| 5,215,795 | 6/1993 | Matsumoto et al. | 280/743.1 |
| 5,277,230 | 1/1994 | Sollars, Jr. | 280/743.1 |
| 5,356,680 | 10/1994 | Krummheuer et al. | 280/728.1 |

STRUCTURALLY EFFICIENT INFLATABLE PROTECTIVE DEVICE

This invention was made with support of the United States Government under Contract No. DE-AC0476DP00789, awarded by the Department of Energy. The United States Government has certain rights in the invention.

This application is a continuation of application Ser. No. 08/355,241, filed Dec. 9, 1994, U.S. Pat. No. 5,533,755, which is a continuation of application Ser. No. 08/082,471 filed Jun. 28, 1993 which issued as U.S. Pat. No. 5,482,317 on Jan. 9, 1996.

BACKGROUND OF THE INVENTION

1. Field of the Invention

The present invention relates to inflatable protective cushions, and provides an apparatus particularly useful in an airbag for protecting passengers in automotive vehicles. The present invention would also be useful for many types of transportation vehicles, as well as machinery, as a protective device that can be stored compactly.

Inflatable protective cushions used in passenger vehicles are a component of relatively complex systems. The main elements of these systems are: an impact sensing system, an ignition system, a solid propellant material, an attachment device, a system enclosure, and an inflatable protective cushion. Upon sensing an impact, the propellant is ignited causing an explosive release of gases filling the cushion to a deployed state which can absorb the impact of the forward movement of a body and dissipate its energy by means of rapid venting of the gas. The entire sequence of events occurs within about 30 milliseconds. The maximum pressure occurring in the cushion in the inflation event is about 4 psi and increases to about 7–8 psi when impacted by a person. In the un-deployed state, the cushion is stored in or near the steering column, the dashboard, in a door, or in the back of a front seat placing the cushion in close proximity to the person it is to protect.

To provide efficient storage and adequate protection, it is advantageous to have an inflatable protective cushion that has a small volume when not deployed permitting compact storage, low permeability permitting fast inflation, and strength for withstanding inflation pressure and absorbing the impact of a person or an object.

2. Description of Related Art

Many of the traditional driver's side inflatable cushions are of a circular shape constructed with two circular pieces made from a coated fabric made with 420–840 denier nylon yarn as shown FIG. 1. This product has several deficiencies. First, the design shape may result in a circumferential seam creating preferential locations for failure where the seam is perpendicular to the bias directions of the yarn. Second, that cushion inherently has wrinkles that result in high and low stress areas enhancing the probability of the cushion failing to withstand inflation pressure and impact when deployed. Third, the 420–840 denier fabric and coating on the fabric results in a heavier and bulkier cushion that is not compact when stored. Fourth, the rough surface of the fabric tends to be abrasive leading to facial cuts and abrasions in deployment because of use of the larger denier yarns. Fifth, the coatings that may be on the fabric add significantly to the manufacturing costs. Sixth, the circular shape results in material waste during manufacturing. Finally, the traditional cushions may have discrete vent ports to provide rapid deflation that can cause injury when the hot gases exit the cushion vent ports in a concentrated manner.

SUMMARY OF THE INVENTION

The objects of the present invention are to provide a low cost inflatable protective device with a cushion of simple and structurally efficient design with a shape and construction that optimizes the cushion's ability to withstand inflation pressure and impact when deployed.

To achieve the objects and in accordance with the purpose of the invention, as embodied and broadly described herein, the invention includes a sheet defined by at least one fold line and a plurality of flap portions, each flap portion having a base edge corresponding to a fold line and at least two side edges each extending outwardly from the base edge and ultimately converging to meet each other, the flap portions being folded at the fold lines with each of the flap portions substantially converged to form an apex above the sheet and being joined at corresponding side edges to define an inflatable chamber.

A further object of the invention is to provide an inflatable protective cushion with a shape, construction, and material that optimizes the cushion's ability to withstand inflation pressure and impact when deployed and minimizes the packed volume of the cushion in its un-deployed state. This object is achieved by this invention by having the cushion include a sheet configured as described above with the sheet made of a lightweight, low permeability, material.

An even further object of the invention is to provide an inflatable protective cushion with a self-venting material so that discrete vent ports are not necessary, thereby avoiding potential burn injuries and permitting the inflation device to contain less propellant material. This object is achieved by this invention by having the cushion include a sheet configured as described above with the sheet made of a material having an air permeability sufficient to deflate the cushion through the seams and the sheet material.

Another object of the invention is to provide an inflatable protective cushion with a surface that is less abrasive when impacted by a person or object. This object is achieved by this invention by having the cushion include a sheet configured as described above with the sheet material being made from yarn having a denier less than 420.

An additional object of the invention is to provide a method of making a low cost inflatable protective cushion of simple and structurally efficient design with a shape and construction that optimizes the cushion's ability to withstand inflation pressure and impact when deployed and minimizes the packed volume of the cushion when stored in its un-deployed state.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the written description and claims as well as the appended drawings.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In these drawings, "bottom" is meant to designate the surface of the protective cushion which is intended to be impacted by a person or object to be protected. "Top" is meant to designate views of the protective cushion from the side opposite that which is intended to be impacted by a person or object to be protected.

DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

In accordance with the invention, the present invention for an inflatable protective cushion includes a sheet of material which may be constructed from more than one piece of material, but preferably is constructed from a single piece. A single piece construction is advantageous because it lowers manufacturing costs by minimizing cutting steps and seams. Additionally, a single piece construction can reduce the number of seams susceptible to failure under inflation pressure and upon impact of a body or object on the cushion.

Figure 2:
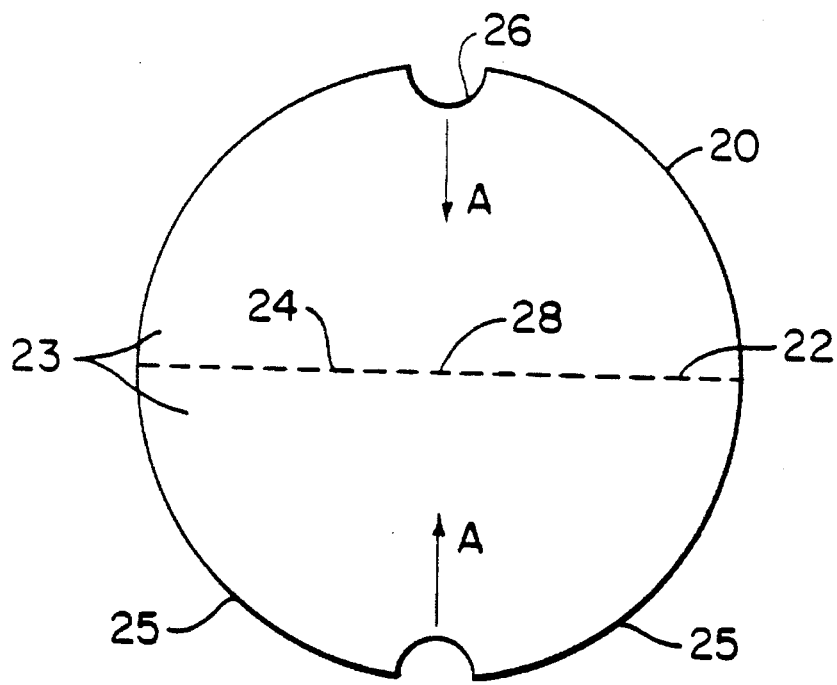
FIG. 2 is a top view of an embodiment of the sheet of the invention with a curved edge mounting means before assembly.
Figure 3:
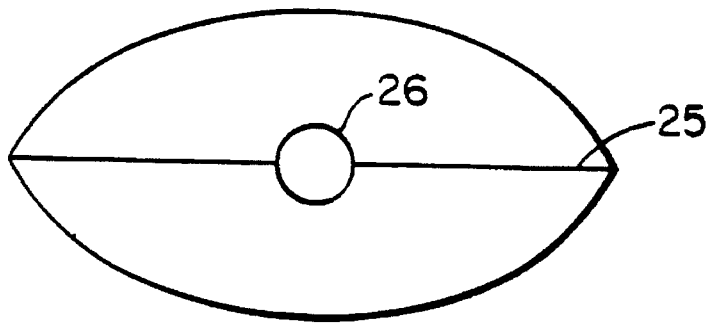
FIG. 3 is a top view of an embodiment of the sheet of the invention with a curved edge mounting means after assembly.

As embodied herein and depicted in FIG. 2, sheet 20 is defined by at least one fold line 22 and a plurality of flap portions 23, each flap portion having a base edge 24 corresponding to a fold line 22 and at least two side edges 25 each extending outwardly from base edge 24 and ultimately converging to meet each other, but preferably meeting at a means for mounting sheet 20 to an inflation device. Additionally, as depicted by arrows A in FIG. 2, flap portions 23 are folded at fold line 22 with each of flap portions 23 substantially converged to form an apex 28 above the center of the sheet 20 and the corresponding side edges 25 of the flap portions are joined to define an inflatable chamber.

Figure 1:
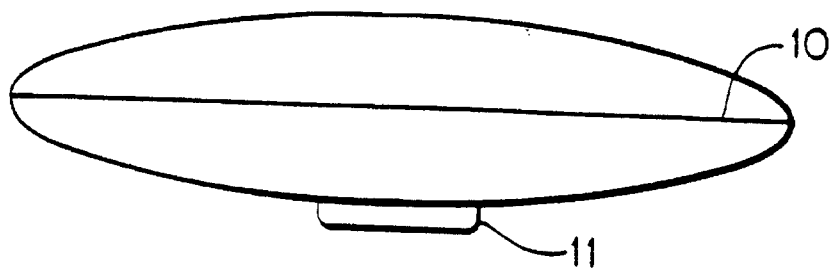
FIG. 1 is a side view of a traditional inflatable cushion.

This configuration provides a cushion that can efficiently distribute loads applied with inflation pressure and impact from a person or object to be protected. The load-handling efficiency is realized when traditional materials used for airbags as well as when lighter fabrics are used. Additionally, this configuration is simpler to manufacture based on the ease of sewing straight-edged seams as compared to circumferential seam 10 of a traditional driver's side cushion described above and shown in FIG. 1. Preferably, sheet 20 does not have a coating which tends to increase the packing volume and adds to manufacturing costs. Nevertheless, the load-handling efficiencies of this invention are also realized with coated materials, and accordingly, this invention also encompasses embodiments wherein sheet 20 includes a coating made of, for example, rubber or silicone.

Figure 4:
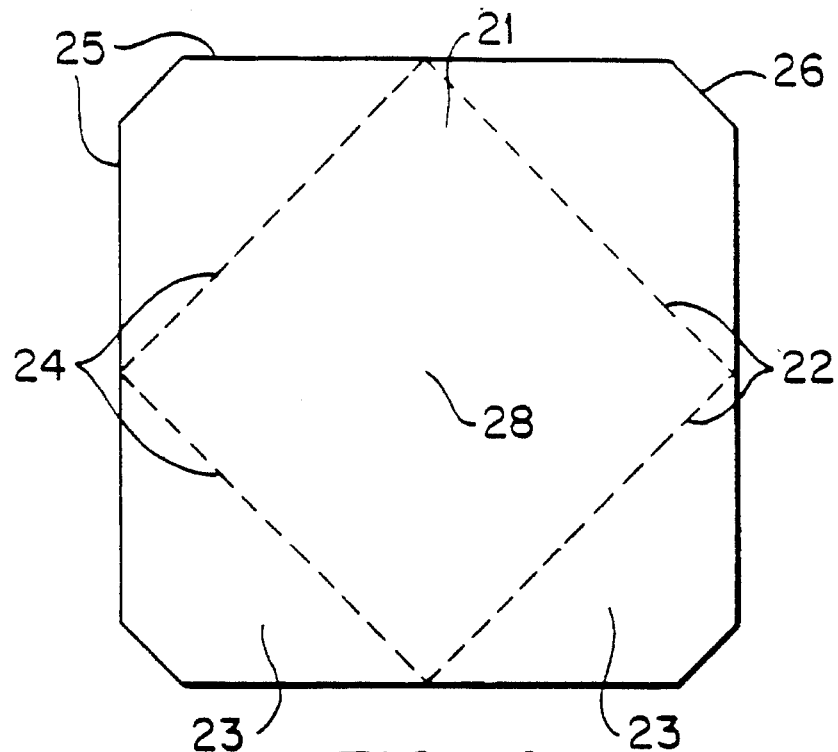
FIG. 4 is a top view of a second embodiment of the sheet of the invention with a straight-edged mounting means before assembly.

Preferably, the means for mounting sheet 20 to an inflation device include an edge 26 of sheet 20 that will conform to a portion of the outside perimeter of the inflation port of inflation devices. More preferably, as shown in FIGS. 2–3, 6–7, edge 26 is curved to conform to the outside perimeter of a cylinder which is the common shape of inflation ports of inflation devices. Alternatively, as embodied herein and shown in FIGS. 4–5, edge 26 has straight edges to conform to the outside perimeter of a square tube which is an alternative shape for an inflation port of an inflation device.

It will be apparent to those of ordinary skill in the pertinent art that various modifications and variations can be made to the mounting means. For example, the shape of edge 26 can be modified to conform with any shape that an inflation device has at the area where it interfaces the cushion. Edge 26 can conform to any oblong or polygonic shape, which are within the scope of this invention.

Preferably, as embodied herein and as shown in FIGS. 4, 6, 8–11, sheet 20 further has a polygonal central portion 21 and at least three fold lines 22 which define the perimeter of central portion 21. Embodiments with sheet 20 having central portion 21 tend to provide the advantage of more impact surface area per sheet material to protect a person or object when deployed.

Figure 6:
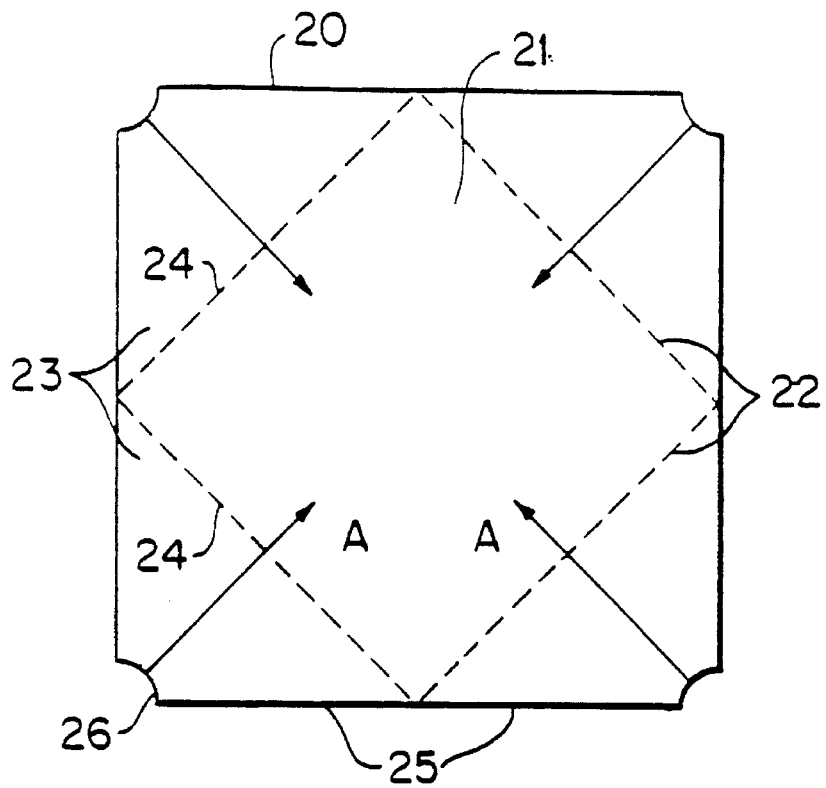
FIG. 6 is top view of a preferred embodiment of the sheet of the invention before assembly depicting the construction of a preferred embodiment of the sheet of the invention.
Figure 13:
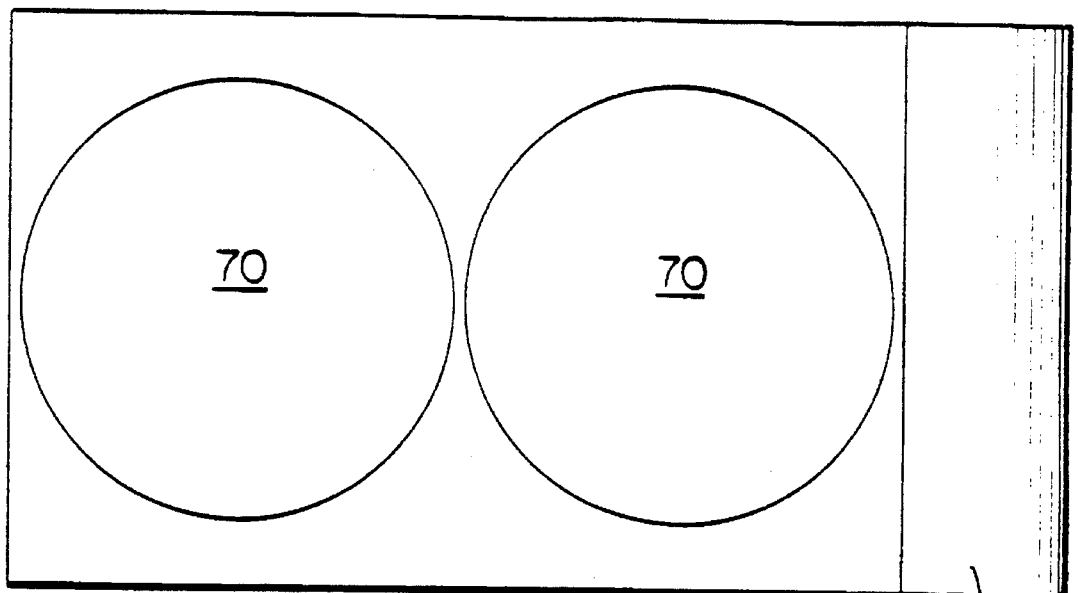
FIG. 13 is a diagram depicting the portion of a bolt of material used to construct a traditional driver's side inflatable cushion.
Figure 14:
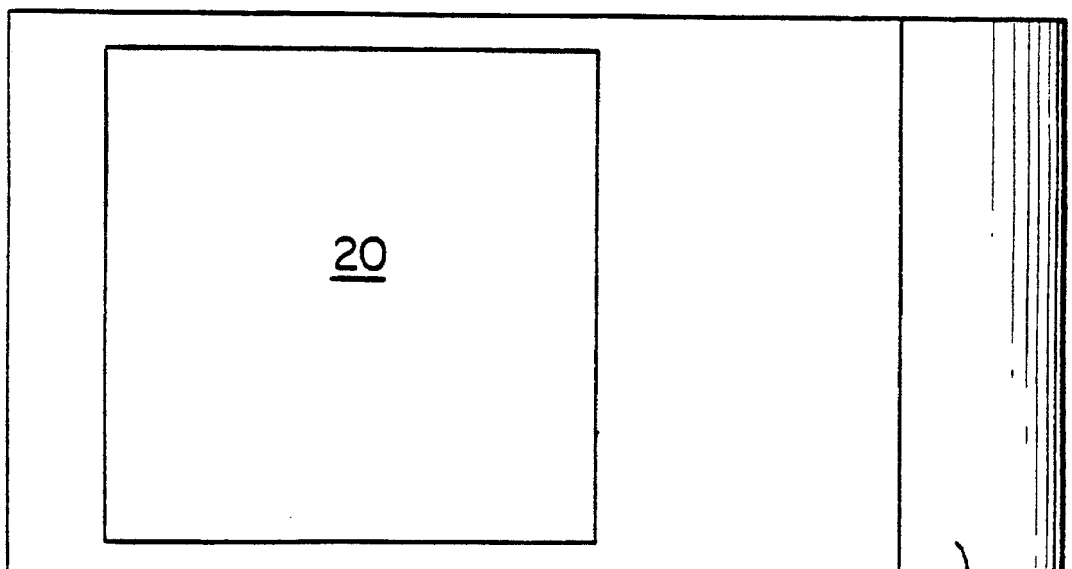
FIG. 14 is a diagram depicting the portion of a bolt of material used to construct the preferred embodiment of the sheet of the invention.

In the preferred embodiment, as embodied herein and as depicted in FIG. 6, sheet 20 is substantially in the shape of a square, polygonal central portion 21 of sheet 20 is substantially square shaped, and flap portions 23 are substantially triangular. This preferred embodiment is particularly advantageous because it minimizes waste of the parent material as compared to material used for a traditional driver's side cushion. As shown in FIG. 13, the circular pattern 70 that is cut to make circular-shaped cushions results in significant waste of material from the bolt of material 71. On the other hand, as shown in FIG. 14, a significant portion of parent material from bolt of material 71 is preserved when this preferred embodiment of sheet 20 of the present invention is used, and the conserved material can then be used to provide material for another sheet 20 as bolt 71 is opened.

Figure 8:
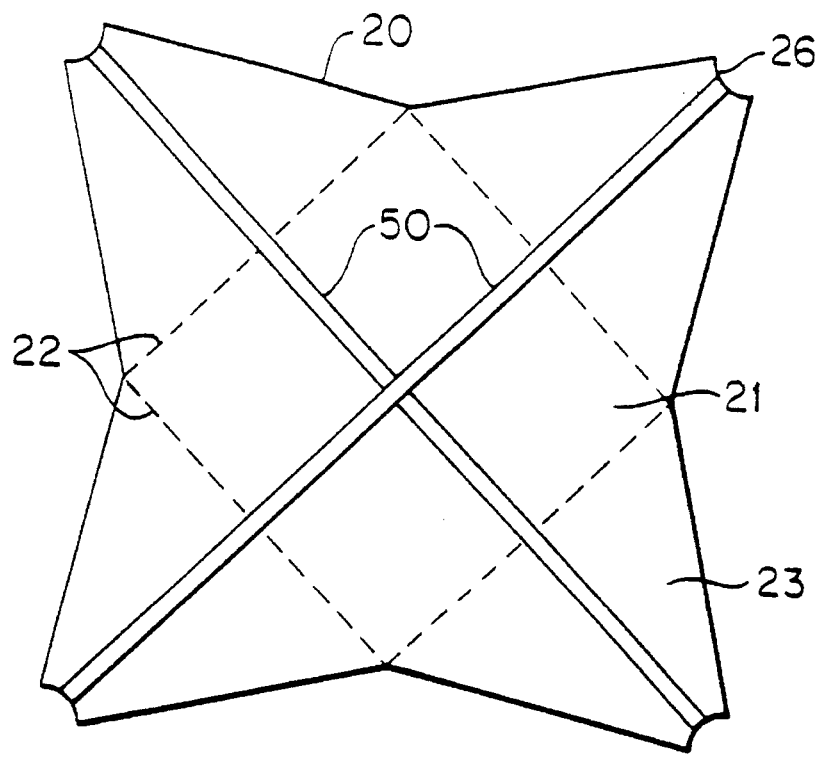
FIG. 8 is a bottom view of a first alternative embodiment of the sheet of the invention before assembly.

In an alternative embodiment of the invention, as embodied herein and as shown in FIG. 8, sheet 20 is non-square shaped, polygonal central portion 21 of sheet 20 is substantially square shaped, and flap portions 23 are substantially triangular.

Figure 9:
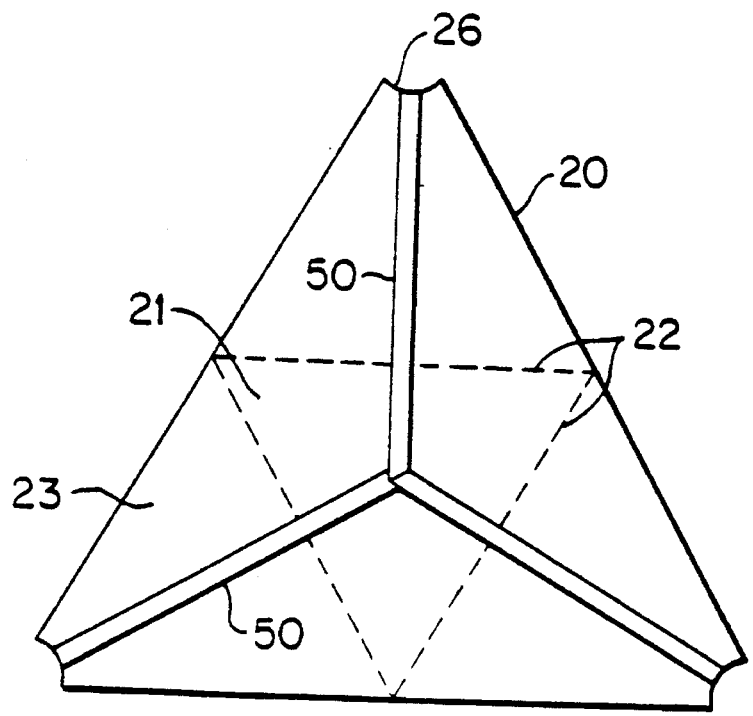
FIG. 9 is a bottom view of a second alternative embodiment of the sheet of the invention before assembly.

In another alternative embodiment of the invention, as embodied herein and as shown in FIG. 9, sheet 20, polygonal central portion 21 of sheet 20, and flap portions 23 are all substantially triangular.

Figure 10:
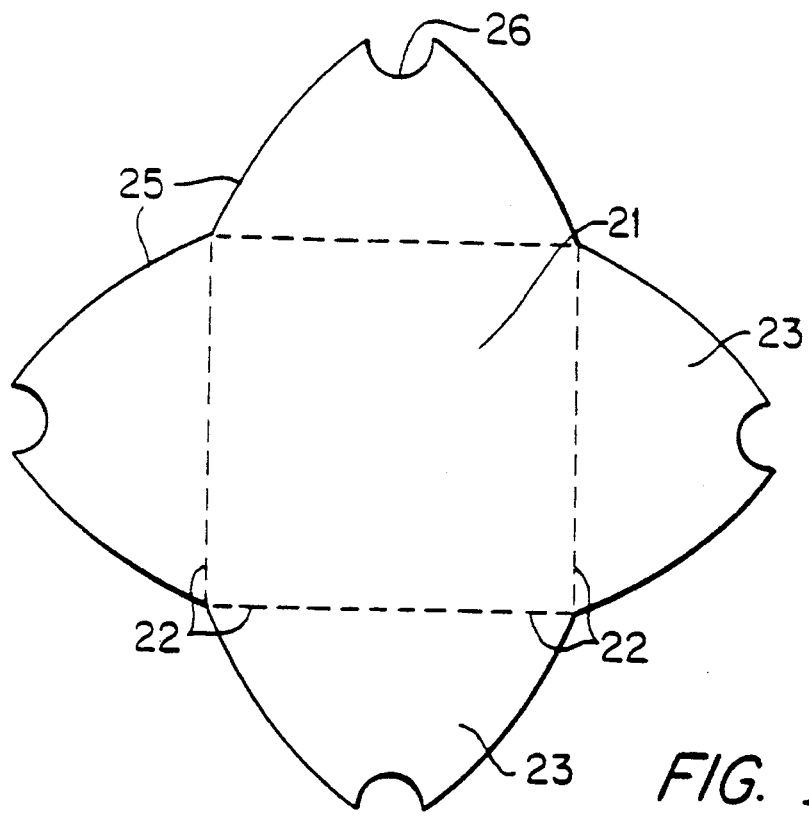
FIG. 10 is a top view of a third alternative embodiment of the sheet of the invention before assembly.

In another alternative embodiment of the invention, as embodied herein and as shown in FIG. 10, polygonal central portion 21 is substantially square shaped and side edges 25 of flap portions 23 are not straight and are defined by an arc between central portion 21 and edge 26. The arc-shaped side edges 25 are advantageous because they provide an overall cushion shape approximating a sphere which is advantageous for withstanding internal inflation pressure.

Figure 11:
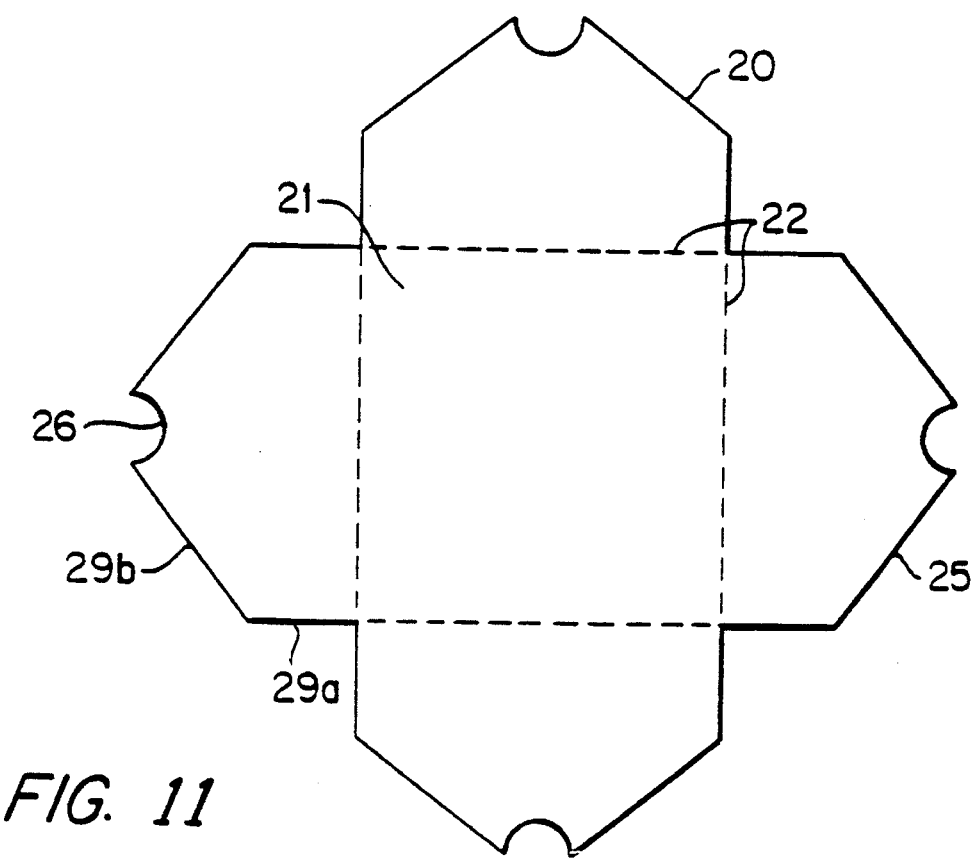
FIG. 11 is a top view of a fourth alternative embodiment of the sheet of the invention before assembly.

In yet another alternative embodiment of the invention, as shown in FIG. 11, sheet 20 is non-square shaped, and polygonal central portion 21 of sheet 20 is substantially square shaped. In this alternative embodiment side edges 25 include two sections each with a first section 29a not converging toward edge 26 and a second section 29b converging at edge 26. Accordingly, this invention contemplates a variety of configurations for side edges 25 that may include multiple sections in multiple directions as long as side edges 25 ultimately converge to meet each other, and preferably meet at the mounting means.

Figure 12:
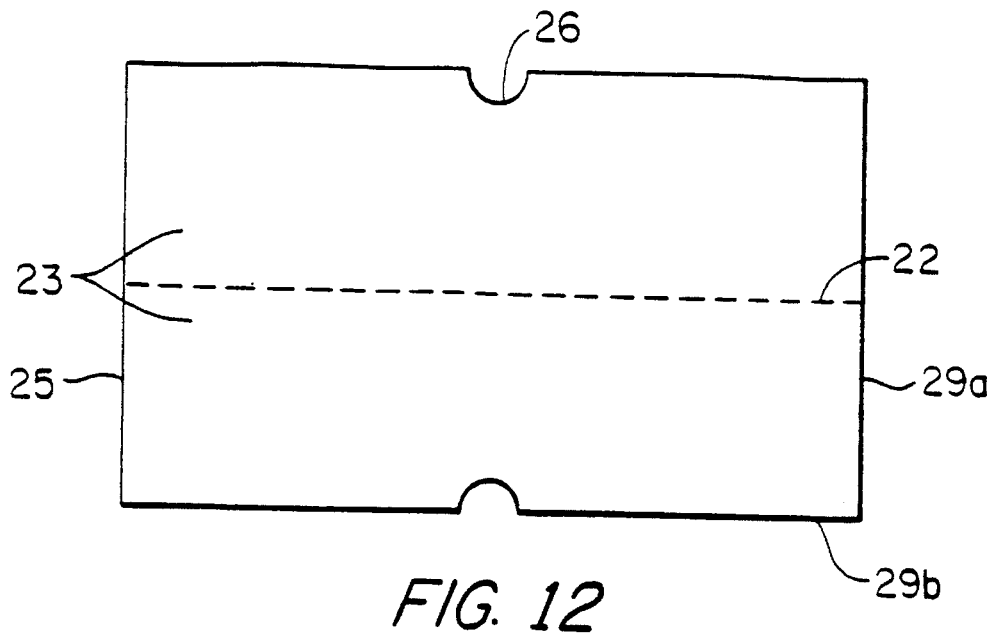
FIG. 12 is a top view of a fifth alternative embodiment of the sheet of the invention before assembly.

In yet another embodiment of the invention, as shown in FIG. 12, sheet 20 has only one fold line 22 and side edges 25 include two sections each with a first section 29a not converging toward edge 26 and a second section 29b converging at edge 26. This embodiment possesses the same advantage as the embodiment shown in FIGS. 2 and 3 in that it allows for a single continuous seam. This embodiment, however, provides the additional advantages of requiring fewer cutting operations and providing more lateral impact surface area that may be required in some applications such as for a passenger-side inflatable cushion.

In accordance with the invention, the present invention may further include a seam defined by the area where side edge 25 of flap portion 23 is joined to adjacent side edge 25 of adjacent flap portion 23.

Figure 5:
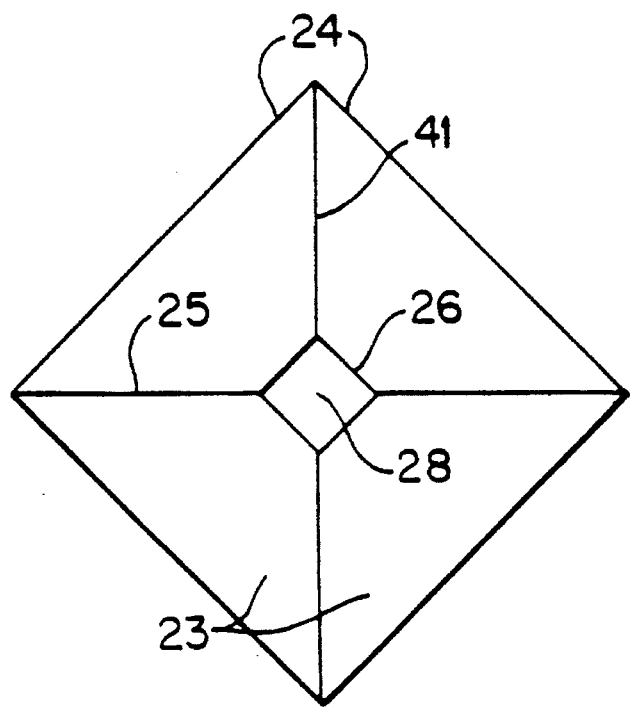
FIG. 5 is a top view of a second embodiment of the sheet of the invention with a straight-edged mounting means after assembly.
Figure 15:
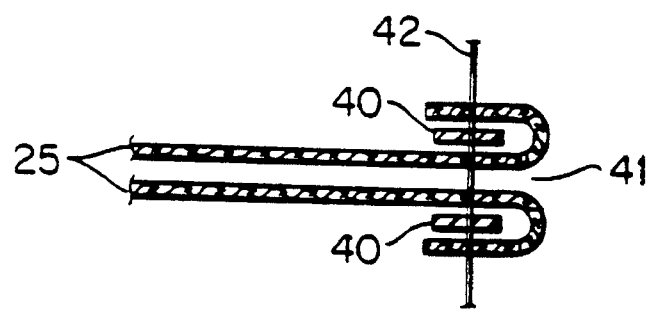
FIG. 15 is a depiction of a seam joined with a one row of stitching with tape.

In the preferred embodiment, seam 41 includes stitching of side edge 25 of flap portion 23 to side edge 25 of adjacent flap portion 23 to form seams 41 as embodied herein and as depicted in FIG. 5. More preferably, as shown in FIG. 15, seam 41 includes one row of single-throw zigzag stitching 42 with seven stitches/in. using FF nylon thread (V-T-295, Type I) through a single fold over of edges 25.

It will be apparent to those of ordinary skill in the pertinent art that modifications and variations can be made to seam 41 of the present invention depending on the material from which sheet 20 is made and the loads it is expected to withstand. For example, seam 41 may be made by having flap portions 23 joined together by hot melting the edges together or bonding them with an adhesive. Additionally, if seam 41 is made of stitching, the stitching may be modified and varied from that explicitly described herein. For example, the size of thread, material of thread, and spacing of the stitches can be varied. Such modification, however, will not depart from the scope of this invention.

Although, for embodiments of this invention, the material used for sheet 20 may be selected from any material having air permeabilities less than 10 cfm/sq. ft. at a pressure drop of 0.5 in. of water across the material ("CFM") as measured by Federal Test Method Standard ("FTM") No. 5450, in a preferred embodiment of the invention, sheet 20 is a material having: (1) an air permeability of less than 1.10 CFM as measured by FTM 5450; (2) a grab tensile strength of less than 255 lbs. as measured by ASTM 1682; (3) a tongue tear strength of less than 8.0 lbs. as measured by ASTM 2261; and (4) a Mullen burst strength less than 325 psi as measured by ASTM D-3786. This embodiment has the advantage of providing an inflatable cushion that can be inflated with less propellant and yet withstand the inflation pressure and impact from a person or object to be protected.

In a further preferred embodiment of the invention, sheet 20 has the additional property of having a light weight between 1.0–4.0 oz./sq.yd., more preferably between 1.9–3.2 oz./sq. yd., as measured by FTM 5041. A weight of this range contributes to the advantages of lower materials costs and a low pack volume for the cushion when stored in an un-deployed state.

In a yet another further preferred embodiment of sheet 20 of the invention, the material of sheet 20 is a cloth woven in a plain weave with a high cover factor. The woven cloth is made of high tenacity yarn with components resistant to degradation by heat or light. Preferably, the yarn is nylon 6,6, but can be other high tenacity materials such as polyester or Kevlar®. One or both sides of the cloth may be calendered. As shown in Table 1 for fabric style 54412/104, calendering enhances the low permeability characteristics and reduces the thickness (and packing volume) of sheet 20. A trilobal yarn, however, may be used to reduce processing costs because it may avoid or reduce the amount of calendering needed to maintain an acceptably low permeability. Use of a trilobal yarn may have the further advantage of producing sheet 20 with yarn that will stay intact with time.

In yet another preferred embodiment of sheet 20 of the invention, the sheet is made of a cloth woven with less than 420, and more preferably less than 300, denier yarn. Even more preferably, sheet 20 is made of a cloth woven with yarn of a denier between 30 and 200. These embodiments provide the advantage of a less abrasive surface for impact with a person or object. Moreover, the smaller denier yarn provides a lighter cushion and lower pack volume.

TABLE 1

| TEST Styles | METHOD | UNITS | FABRICS 54412/104 | 54412/104 | 64144 | 64145 | 64146 |
|---|---|---|---|---|---|---|---|
| Fibers | | | | | | | |
| Nylon 6,6 | | | | | | | |
| Warp | | | "Calendered" 45/15 T - 143 ICI | "Uncalendered" 45/15 T - 143 ICI | 45/15 T - 143 ICI | 70/34 T - 185 DuP. | 100/34 T - 1943 ICI |
| Filling | | | 45/15 T - 143 ICI | 45/15 T - 143 ICI | 100/34 T - 1943 ICI | 100/34 T - 1943 ICI | 140/26 T - 728 DuP. |
| Width | FTM-5020 | inches | 61.63 | 63.50 | 63.00 | 61.5 | 63.50 |
| Weight | FTM-5041 | oz./sq.yd. | 2.12 | 2.04 | 2.51 | 2.70 | 3.20 |
| Count | FTM-5050 | | | | | | |
| Warp | | ends/in. | 220 | 215 | 184 | 153 | 128 |
| Filling | | picks/in. | 107 | 106 | 96 | 90 | 68 |
| Thickness | ASTM-1777 | inches | 0.0042 | 0.0053 | 0.0042 | 0.0045 | 0.0060 |
| Air Porosity | FTM-5450 | cfm/sq.ft. | 0.85 | 11.6 | 0.44 | 3.05 | 1.05 |
| Mullen Burst | ASTM-D-3786 | lb./sq.in. | 105 | 112 | 237 | 199 | 319 |
| Tensile Strength | ASTM-1682 | lbs. | | | | | |
| Warp | (1" strip) | | 134 | 118 | 103 | 98 | 173 |
| Filling | | | 75 | 72 | 130 | 118 | 171 |
| Elongation | ASTM-1682 | % | | | | | |
| Warp | | | 35.8 | 29.7 | 21.9 | 36.5 | 26.8 |
| Filling | | | 31.5 | 28.4 | 33.9 | 31.2 | 22.9 |
| Tongue Tear | ASTM-2261 | lbs. | | | | | |
| Warp | | | 7.7 | 7.5 | 4.3 | 5.7 | 12.1 |
| Filling | | | 6.6 | 6.5 | 6.8 | 9.7 | 16.7 |
| Tensile Strength | ASTM-1682 | lbs. | | | | | |
| Warp | (Grab) | | 197.2 | 195.0 | 153 | 139 | 251 |
| Filling | | | 113.0 | 106.6 | 197 | 155 | 225 |
| Elongation | ASTM-1682 | % | | | | | |
| Warp | | | 27.6 | 26.0 | 24.7 | 32.4 | 22.9 |
| Filling | | | 25.9 | 20.0 | 35.4 | 26.8 | 20.4 |

In another further preferred embodiment of sheet 20, the sheet is made of a substantially balanced woven cloth with a grab tensile strength in the lower of the warp and filling directions being no more than 25 percent, more preferably no more than 15 percent, lower than the grab tensile strength in the higher of the warp and filling directions. As shown in Table 1 for fabric styles 64144 and 64146, such balancing provides the advantages of improved angular tearing properties and more equal strength in both the warp and filling directions so as to avoid a preferred failure mode between those two directions. These characteristics appear to optimize the cushion's ability to endure inflation pressure and the impact of a person or object to be protected.

In another further preferred embodiment of the invention, seam 41 further includes seam reinforcement means.

Preferably, as shown in FIG. 15, the seam reinforcement means includes a flat tape 40. Side edges 25 are folded over onto tape 40 which is a ½ in. wide double-sided contact adhesive tape (e.g., 3M® No. 665) to hold the material in place during stitching. Tape 40 also helps sustain the longitudinal load that is transferred from sheet 20 across seam 41 and also provides a backing material for stitching 42 which helps mitigate the possibility of stitch failure due to circumferential pressure loads. Alternatively, tape 40 may be made of 550 lb. or 300 lb. reinforced material, such as nylon, with a width of 2 in. (Mil-W-83144, Type S-IV). Other types of tape, with or without adhesive, with or without reinforced material, or of different sizes may be used as well, and those of ordinary skill in the pertinent art can select such tape without undue experimentation.

An alternative embodiment for the seam reinforcement means includes adhesive applied in the area of or near seam 41. Adhesive assists load transfer across the entire surface area of seam 41 reducing the load to stitches 42 and minimizing the probability that sheet 20 will comb at seam 41 if sheet 20 is made of a woven fabric. Only adhesives that have no detrimental effects on the material properties of sheet 20 should be used. Those skilled in the pertinent art can select such adhesives without undue experimentation.

It will be apparent to those of ordinary skill in the pertinent art that various modifications and variations can be made in the seam reinforcement means of the present invention without departing from the scope or spirit of the invention. As an example, the placement of tape 40 in the area of or near seam 41 is dependent on the type of stitching utilized. Accordingly, those skilled in the art will know, or will be able to determine without undue experimentation, the placement of tape 40 to reinforce other stitch types than those specifically described and depicted herein. Additionally, a combination of tape 40 and adhesive may be used to reinforce seam 41.

In another preferred embodiment of the invention, the present invention further includes expansion limiting means attached to sheet 20. Expansion limiting means may provide several functions depending on the configuration used. First, expansion limiting means can restrain expansion of the cushion as, for example, may be desired to keep the cushion a set distance from the person or object it is intended to protect. Second, the expansion limiting means may permit one to tailor a desired shape of the cushion. Third, expansion limiting means can transfer and more evenly distribute loads from high stress regions on sheet 20.

Preferably, the expansion limiting means includes a strap 50 fixed to sheet 20. More preferably strap 50 is fixed to the exterior of sheet 20, but may be fixed to the interior of sheet 20. An external strap 50 can also be utilized as an attachment for a penetration and thermal barrier component.

Figure 16:
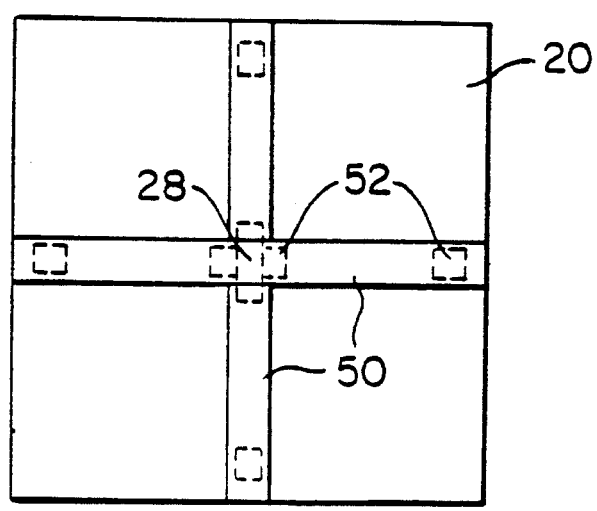
FIG. 16 is a bottom view of the preferred embodiment of the sheet of the invention with tacked down external straps.

A further preferred embodiment of the expansion limiting means includes a plurality of straps 50 with at least one, but preferably two, pieces of 2 in. wide 300 lb. reinforced nylon tape (Mil-T-5608, Class E, Type II) cemented, taped, glued, stitched, or tacked down by other means to sheet 20. Preferably, as embodied herein and shown in FIGS. 7–9, straps 50 run perpendicular to each fold line 22 of sheet 20, and are only tacked at select locations so that they remain oriented perpendicular to each fold line. For example, as shown in FIG. 16, which is a bottom view of the preferred embodiment of sheet 20 shown in FIGS. 6–7, double-sided contact adhesive tape 52 is used to tack down straps 50. Straps 50 are additionally stitched together where they intersect and stitched to sheet 20 where they reach apex 28 on the top side of the cushion (not shown in FIG. 16). Additionally, straps 50 may be made from the same material used for sheet 20.

An alternative embodiment of the expansion limiting means includes tethers 51. The ends of tethers 51 may be attached to the interior of sheet 20 and to attachment hardware for mounting the cushion. Tethers 51 may be attached at a variety of locations depending on the extent and type of expansion desired and whether they are intended to tailor the shape of the cushion. At locations where tethers 51 are attached to sheet 20, reinforcement tape is sewn onto sheet 20 to distribute the loads from tethers 51.

Figure 17:
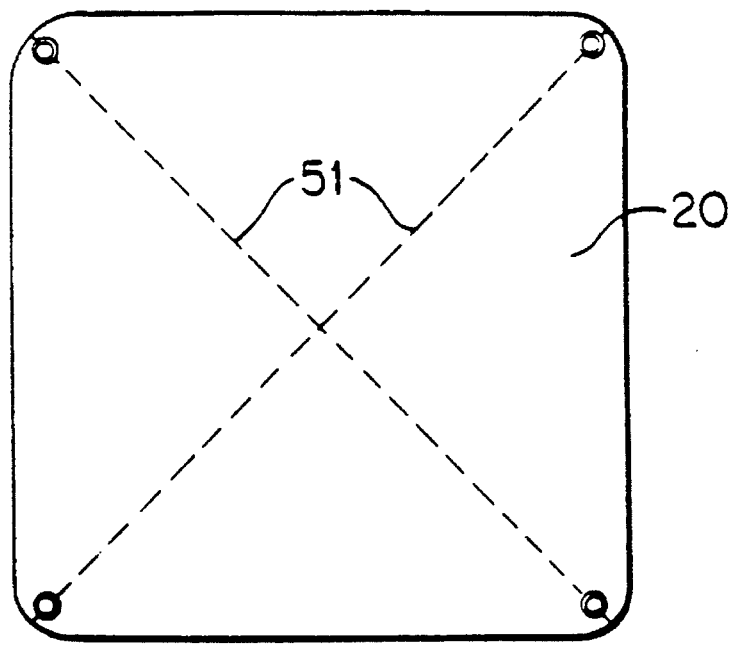
FIG. 17 is a schematic of internal tethers in a diagonal configuration.
Figure 18:
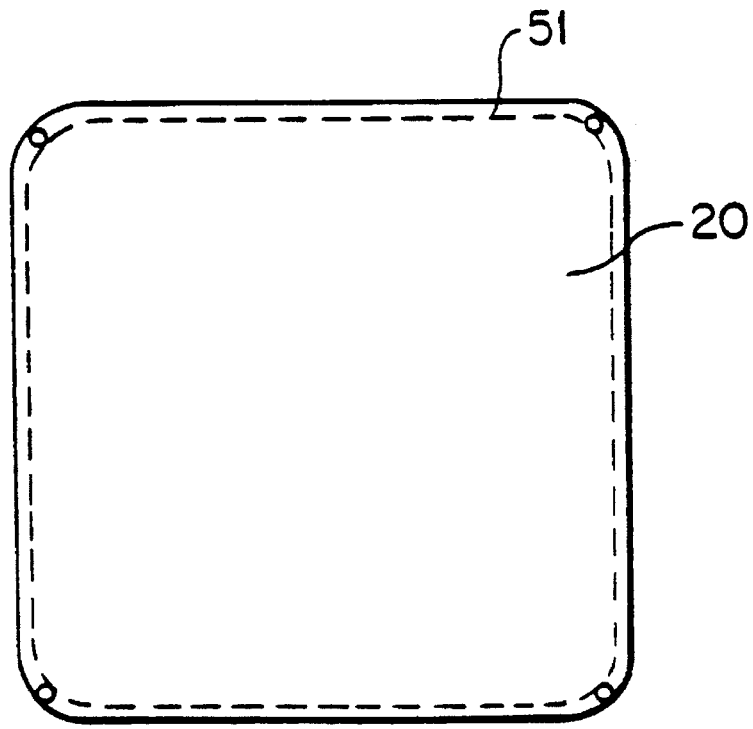
FIG. 18 is a schematic of internal tethers in a circumferential configuration.

It will be apparent to those skilled in the art that various modifications and variations can be made in the tethering configuration of the present invention without departing from the scope or spirit of the invention. For example, two tethering configurations, diagonal and circumferential, are illustrated in FIGS. 17 and 18, both of which eliminate the four pointed corners of the folded square sheet 20 configuration, making a rounded inflated cushion profile. These tethering configurations primarily tailor the shape of the cushion.

Figure 19:
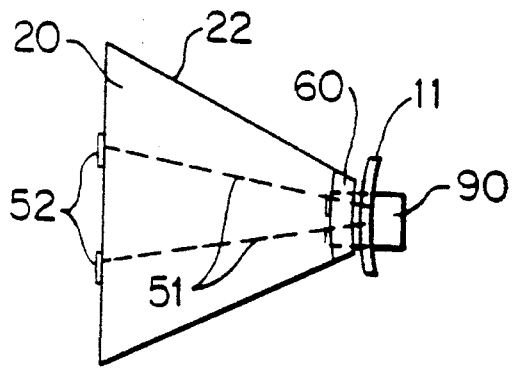
FIG. 19 is a cross-sectional view of an embodiment of the invention with internal tethers anchored to the attachment hardware.

As another example, as shown in FIG. 19, internal tethers 51 may be anchored to attachment hardware 11 for mounting the cushion. This tethering configuration primarily limits expansion in the direction perpendicular to attachment hardware 11 as may be desired for keeping the inflated cushion a set distance from the person or object it is to protect.

In yet another preferred embodiment of the invention, the present invention further includes a circumferential collar. As embodied herein and shown in FIG. 7, circumferential collar 60 is attached around edge 26 of folded flap portions 23 substantially near apex 28. The configuration of circumferential collar 60 may be designed to best permit mounting of the cushion to the attachment hardware 11 (shown in FIG. 1) and to permit ease in inflation of the cushion. Circumferential collar 60 may be shaped to be compatible with the current commercially available mounting designs and inflation components.

Figure 7:
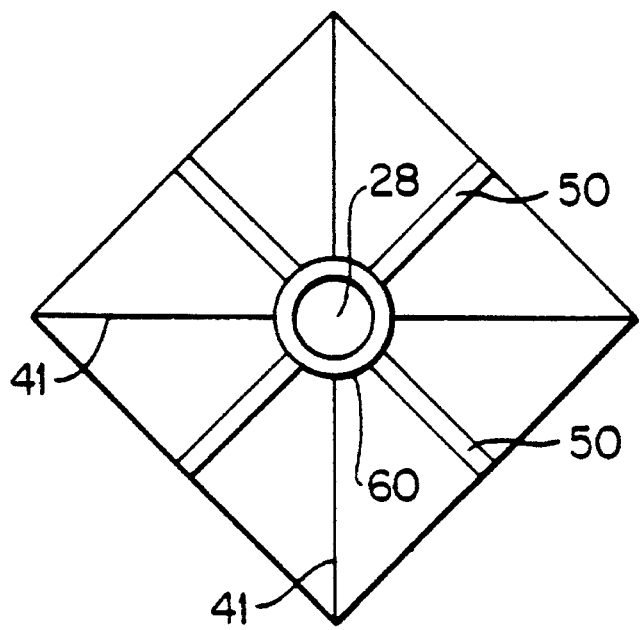
FIG. 7 is a top view of a preferred embodiment of the sheet of the invention with external straps after assembly.

Preferably, as shown in FIG. 7, circumferential collar 60 is a unitary 2 in. wide ring made of 420 denier woven nylon cloth which is attached to sheet 20 with silicone spray (e.g. 3M® Super 77™) or an RTV sealant (e.g., Dow Corning®732™ Multi-Purpose Sealant) and is-stitched to sheet 20 at each side of each seam 41 Alternatively, circumferential collar 60 may be made of the material of sheet 20.

Figure 20:
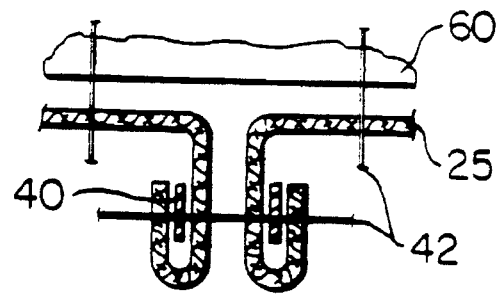
FIG. 20 is a depiction of the preferred embodiment of the seam in the area of the circumferential collar.

To avoid failures at circumferential collar 60 during inflation, care must be taken not to fold down seam 41 when attaching flap portions 23 to circumferential collar 60. For example, as embodied herein and shown in FIG. 20, seam 41 is not folded over and sewn down to circumferential collar 60, which is undesirable because it enhances material failure during inflation. Preferably, a silicone adhesive or contact cement is put on seam 41 in the area of circumferential collar 60 to give seam 41 some rigidity during stitching and to prevent it from folding down.

Figure 21:
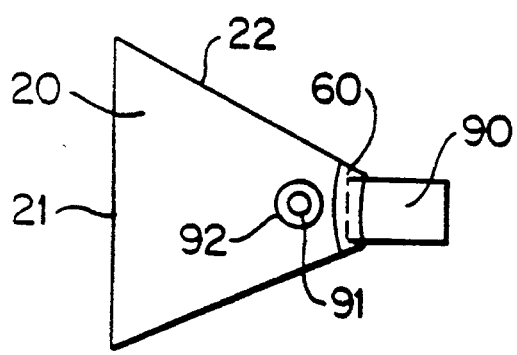
FIG. 21 is a cross-sectional view of an embodiment of the invention, including a discrete vent port and a depiction of an inflation device.

In yet another embodiment of the invention, the present invention includes an inflation device 90, as shown in FIG. 21, with less than 85 gm., and more preferably less than 70 gm., of sodium azide or similar propellant material. Traditional inflatable cushions with a volume greater than 1.8 cu. ft. have used greater than 85 gm. of sodium azide because that much propellant is needed to inflate those cushions which utilize discrete vent ports and materials with low permeability. Embodiments of the present invention with volumes greater than 1.8 cu. ft. which provide more venting through the seams and the material of sheet 20 itself, on the other hand, may provide the advantage of allowing the inflation device to be down sized with less propellant material, and in particular less than 70 gm. of sodium azide.

In another embodiment of the present invention, the invention includes any one of the embodiments of the inflatable protective cushions described herein and further includes a discrete vent port for venting gases from the inflated chamber of sheet 20. As shown in FIG. 21, discrete vent port 91, is preferably located away from the impact surface of sheet 20 to avoid having hot gasses exiting toward the person or object to be protected. Additionally, discrete vent port 91 is preferably reinforced with further material such as tape 92. Discrete vent ports 91 may be added when the air permeability of the material of sheet 20 used is so low that it inhibits sufficient venting through the material itself such that impact from a person or object to be protected creates an overpressure causing the cushion to rupture. Preferably, however, the material of sheet 20 is selected with an air permeability that provides sufficient venting through the material. Such selection can be made by those of ordinary skill in the art without undue experimentation.

Figure 22:
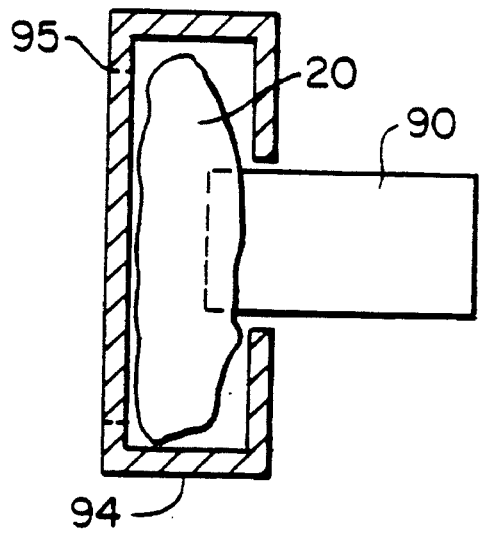
FIG. 22 is a cross-sectional view of an embodiment of the invention, depicting a modular inflatable protective device in an noninflated state.

In yet another embodiment of the invention, the present invention includes any one of the embodiments of the inflatable protective cushions described herein and an inflation device, with the inflatable protective cushion located within a housing 94 which is attached to inflation device 90. Housing 94 has a means for permitting the cushion to exit the housing when inflated. Many alternatives exist for exiting means and are easily selected by those skilled in the art. For example, as shown in FIG. 22, one wall of housing 94 may have perforations 95 that make it a breakaway wall when the cushion exerts pressure on it during inflation. As another example, exiting means may include a hinged door. This embodiment has the advantage of providing a modular inflatable protective device that may be easily mounted on the vehicle or equipment where it is to protect persons or objects.

EXAMPLES

The invention will be further clarified by the following examples, which are intended to be exemplary of the invention.

Example 1

A fabric for a cushion was constructed of 45 denier high tenacity nylon yarn in both the warp and filling directions.

The fabric was compacted through a continuous scour including: (1) soaking approximately 18.5 sec. in a chemical saturator at 190° F. with a 0.5% sodium hydroxide, 0.5% ethoxylated alcohol surfactant, and 0.3% ethylene diamine tetraacetic acid solution; (2) washing in four wash boxes of water at 180° F. for approximately 9.3 sec. per box; (3) acid neutralizing with 4% acetic acid in one wash box for approximately 9.3 sec.; (4) washing in one wash box of water at 180° F. for approximately 9.3 sec.; and (5) steam can drying on two stacks of cans at less than 12 psi steam pressure for approximately 18.0 sec. Next, the fabric was heat set to width in a three zone tenter frame (350°, 400°, 400° F.) at 60 yd./min. Last, the fabric was hot calendered on both sides at 1600 psi at 15 yd./min. in a three roll calender with heated rolls at 300° F. and 400° F. As shown in Table 1 for fabric style 54412/104, fabric properties were: weight 2.1 oz./sq. yd., permeability 0.9 CFM, grab tensile strength 197 lb. warp and 113 lb. filling, and Mullen burst strength of 105 psi.

A cushion was constructed from a 3 ft. square sheet 20 for the embodiment shown in FIGS. 6–7 but without external straps 50. The cushion was subjected to an air pressure inflation test for 75 milliseconds. The maximum inflation test pressure in the cushion before rupture was 7.5 psi.

Example 2

A fabric was constructed as in Example 1. A cushion was constructed in a traditional circular driver's side cushion shape with an internal tether running between the center of the bottom side to the inflation device mounting hardware. No attempt was made to redesign the traditional circular driver's side cushion to accommodate the lightweight fabric. The failure mechanisms for the traditional design, however, were consistent with those observed during tests of commercially available driver's side cushions with heavier fabrics, suggesting that the construction techniques used were not materially different than those used for the commercial products such that they would markedly impact the overall results. The cushion was subjected to an air pressure inflation test for 31 milliseconds. The maximum inflation test pressure in the cushion before rupture was 4.5 psi, only 60% of the pressure withstood in Example 1.

Example 3

A fabric was constructed as in Example 1. A cushion was constructed in a similar manner to that in Example 1 and with external straps 50 of 2 in. wide, 1000 lb. reinforced nylon placed as shown in FIG. 7. The cushion was subjected to an air pressure inflation test for 75 milliseconds. The maximum inflation test pressure developed in the cushion was 11.0 psi, and the cushion vented the additional pressure through its porosity without rupturing.

Example 4

A fabric was constructed with a warp of 100 denier high tenacity nylon yarn and a filling of 140 denier high tenacity nylon yarn. All other process steps were the same as those described in Example 1. As shown in Table 1 for fabric style 64146, the fabric properties were: weight 3.2 oz./sq. yd., permeability 1.05 CFM, grab tensile strength 251 lb. warp and 225 lb. filling, and Mullen burst strength 319 psi. An inflatable protective cushion was constructed the same as in Example 3. The cushion was subjected to an air pressure inflation test for 98 milliseconds. The maximum inflation test pressure developed in the cushion was 11.8 psi, and the cushion vented the additional pressure through its porosity without rupturing.

Example 5

A fabric was constructed of a warp of 45 denier high tenacity nylon yarn and a filling of 100 denier high tenacity nylon yarn. All other process steps were the same as those described in Example 1. As shown in Table 1 for fabric style 64144, the fabric test properties were: weight 2.5 oz./sq. yd., permeability 0.44 CFM, grab tensile strength 153 lb. warp and 197 lb. filling, and Mullen burst strength 237 psi. A cushion was constructed the same as in Example 3. The cushion was subjected to an air pressure inflation test of 50 milliseconds. The maximum inflation test pressure developed in the cushion was 10.0 psi, and the cushion vented the additional pressure through its porosity without rupturing.

Example 6

A fabric was constructed as in Example 5. A cushion was constructed in a similar manner to that in Example 5 and with external straps 50 of 2 in. wide, 1000 lb. reinforced nylon placed as shown in FIG. 7. The cushion was subjected to an air pressure inflation test for 46 milliseconds. The maximum inflation test pressure developed in the cushion was 10.0 psi, and the cushion vented the additional pressure through its porosity without rupturing.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An inflatable protective cushion comprising an uncoated sheet of material made from yarn of less than about 300 denier, said sheet being defined by four or fewer fold lines and a plurality of flap portions, each flap portion having a base edge corresponding to a fold line and at least two side edges each extending outwardly from the base edge, the flap portions being folded at the fold lines and being joined at corresponding side edges to define an inflatable chamber.

2. A cushion as recited in claim 1, wherein said sheet is made of a material having a grab tensile strength of less than 255 lbs. and a Mullen burst strength of less than 325 psi.

3. A cushion as recited in claim 1, wherein said sheet is made of a material having an air permeability of less than 1.10 cfm/sq. ft. at a pressure drop of 0.5 in. of water across the material.

4. An inflatable protective cushion comprising a sheet of material defined by four or fewer fold lines and a plurality of flap portions, each flap portion having a base edge corresponding to a fold line and at least two side edges each extending outwardly from the base edge and ultimately converging to meet each other, the flap portions being folded at the fold lines with each of the flap portions substantially converged to form an apex above the sheet and being joined at corresponding side edges by stitching and without bonding adhesive to define an inflatable chamber.

5. An inflatable protective cushion comprising a sheet of material defined by four or fewer fold lines and a plurality of flap portions, each flap portion having a base edge corresponding to a fold line and at least two side edges each extending outwardly from the base edge and ultimately converging to meet each other, the flap portions being folded at the fold lines with each of the flap portions substantially converged to form an apex above the sheet and being joined at corresponding side edges by stitching and without bonding adhesive to define an inflatable chamber, wherein said sheet is a material made from yarn of less than 300 denier.

6. An inflatable protective cushion comprising a sheet of material defined by four or fewer fold lines and a plurality of flap portions, each flap portion having a base edge corresponding to a fold line and at least two side edges each extending outwardly from the base edge and ultimately converging to meet each other, the flap portions being folded at the fold lines with each of the flap portions substantially converged to form an apex above the sheet and being joined at corresponding side edges to define an inflatable chamber, wherein said edges are joined without reinforcing overlap of said edges.

\* \* \* \* \*